United States Patent [19]

Inoue

[11] Patent Number: 5,444,222
[45] Date of Patent: Aug. 22, 1995

[54] NON-CONTACT IC CARD, TERMINAL FOR USE WITH THE NON-CONTACT IC CARD AND NON-CONTACT IC CARD SYSTEM HAVING THE NON-CONTACT IC CARD AND THE TERMINAL

[75] Inventor: Takeshi Inoue, Itami, Japan

[73] Assignee: Mitsubishi Denki Kabushiki Kaisha, Tokyo, Japan

[21] Appl. No.: 169,401

[22] Filed: Dec. 20, 1993

[30] Foreign Application Priority Data

Dec. 28, 1992 [JP] Japan .................. 4-349171

[51] Int. Cl.⁶ .............................. G06K 5/00
[52] U.S. Cl. ................... 235/380; 235/449; 235/492
[58] Field of Search .............. 235/436, 439, 449, 492, 235/380, 382

[56] References Cited

U.S. PATENT DOCUMENTS

| | | | |
|---|---|---|---|
| 4,845,347 | 7/1989 | McCrindle et al. | 235/492 |
| 5,157,247 | 10/1992 | Takahira | 235/382 |
| 5,225,667 | 7/1993 | Furuta | 235/492 |

FOREIGN PATENT DOCUMENTS

| | | |
|---|---|---|
| 58-154080 | 9/1983 | Japan . |
| 63-284692 | 11/1988 | Japan . |
| 8706375 | 10/1987 | WIPO . |

*Primary Examiner*—Donald Hajec
*Assistant Examiner*—Tho Phan
*Attorney, Agent, or Firm*—Leydig, Voit & Mayer

[57] ABSTRACT

A non-contact IC card, a non-contact IC card terminal and a non-contact IC card system for performing data communication between the IC card and the terminal by using electromagnetic waves are arranged so that the IC card can reliably receive data transmitted from the terminal once the IC card is started up by a startup signal from the terminal. A selection circuit, under the control of a CPU selects a receiving amplifier having a smaller amplification factor in a startup step for receiving the startup signal and a receiving amplifier having a larger amplification factor in a data communication step for exchanging data signals. The sensitivity with which the data signal is received is thereby increased relative to the sensitivity with which data signals are received.

17 Claims, 12 Drawing Sheets

$a_{8a} > a_{8b}$ $n_1 > n_2$

NON-CONTACT IC CARD, TERMINAL FOR USE WITH THE NON-CONTACT IC CARD AND NON-CONTACT IC CARD SYSTEM HAVING THE NON-CONTACT IC CARD AND THE TERMINAL

BACKGROUND OF THE INVENTION

1. Field of the Invention

This invention relates to a non-contact IC card capable of transmitting and receiving data through electromagnetic waves, a terminal for use with the non-contact IC card, and a non-contact IC card system having the non-contact IC card and the terminal and, more particularly, to a non-contact IC card system in which an IC card can receive and transmit data reliably once the IC is started up.

2. Description of the Related Art

FIG. 20 is a block diagram schematically showing the construction of a conventional non-contact IC card 100, such as the one disclosed in Japanese Patent Laid-Open Publication No. 58-154080. Various memories, i.e., a ROM 2, a RAM 3 and an EEPROM 4, are connected through a bus 13 to a CPU 1 for controlling the operation of the non-contact IC card 100 (hereinafter referred to simply as "IC card"). The ROM 2 is a non-volatile memory for storing a program executed by the CPU 1, the RAM 3 is a volatile memory for storing processing results or the like, and the EEPROM 4 is a rewritable non-volatile memory for storing data to be specially preserved, for example, attribute information of the card. An input/output control circuit 5 for controlling the operation of receiving data from a terminal and outputting data to the terminal is also connected to the bus 13. A receiving coil antenna 6 and a transmitting coil antenna 7 are connected to the input/output control circuit 5. The receiving coil antenna 6 is connected through a receiving amplifier 8 and a demodulation circuit 9, while the transmitting coil antenna 7 is connected through a modulation circuit 10, a transmitting amplifier 11 and a drive circuit 12. A battery 14 for supplying electric power to electric circuit sections of the IC card 100, a clock generation circuit 15 and other components are incorporated in the IC card 100. The drive circuit 12 has a power supply terminal 12a through which electric power is supplied from the battery 14, a transistor 12b switched on and off by a signal from the transmitting amplifier 11 to drive the transmitting coil antenna 7, and resistors 12c and 12d for stabilizing the signal from the amplifier 11.

The operation of the IC card when a person who possesses the IC card passes, for example, through a gate controlled by a terminal (both not shown) will be described below. Signals in the form of electromagnetic waves are exchanged between the IC card 100 an the terminal. Since one antenna is used on each of the receiving and transmitting sides, data is serially exchanged between the IC card and the terminal.

When a startup signal transmitted from the terminal at all times is received by the receiving coil antenna 6 of the IC card, it is amplified by the receiving amplifier 8 with a predetermined amplification factor and is sent to the input/output control circuit 5 through the demodulation circuit 9. The clock generation circuit 15 in the IC card generates internal clock pulses thereby to start up the CPU 1. The CPU 1 started up receives a data signal which is then sent from the terminal in the same manner as in the case of the startup signal, deciphers the data signal, and rewrites data in the memories according to the result of deciphering or reads out data previously stored in the memories to make predetermined interpretation and determination on the basis of the data read out. The result of interpretation and determination is sent as a data signal to the transmitting amplifier 11 through the bus 13, the input/output control circuit 5 and the modulation circuit 10 to be amplified with a predetermined amplification factor. The amplified signal is supplied to the drive circuit 12 to be transmitted through the transmitting coil antenna 7 by being converted into electromagnetic waves.

The signal representing the result of interpretation and determination is deciphered in the terminal and the deciphered data is collated with data previously set. If it is determined that the deciphered data is correct, the gate opened and closed under the control of the terminal is opened by a permission signal from the terminal, and the permission to pass through the gate is expressed by a normal display or a normal sound.

Conventional non-contact IC cards are generally arranged as described above. In general, a non-contact IC card has the shape of a portable member and a size generally equal to that of ordinary magnetic cards, and has internal coil antennas formed as a spiral copper foil pattern by etching or the like. Generally, dispersions of the inductance L and the resistance R of coil antennas formed in this manner are very large and dispersions of the characteristics of chip capacitors (not shown) and other circuit elements are also considerable. Similarly, there are also dispersions of the characteristics of coil antennas and other components on the terminal side. Thus, the conventional IC cards and terminals have respective latent receiving sensitivity dispersions due to manufacturing errors. Therefore, in a case where an IC card and a terminal are at a distance from each other close to the limit of the communicable distance range, which distance is small enough to start up the IC card, there is a possibility of failure to receive data during data signal communication after the startup of the IC card, resulting in a communication error and failure to use the essential functions of the IC card.

SUMMARY OF THE INVENTION

In view of the above-described problem, an object of the present invention is to provide a non-contact IC card, a terminal for use with the non-contact IC card, and a non-contact IC card system having the non-contact IC card and the terminal, wherein data communication can always be performed always normally within a communication distance range in which the IC card can be started up by a drive signal from the terminal.

To achieve this object, according to a first aspect of the invention, there is provided a non-contact IC card which starts up by receiving a startup signal from a terminal, a data signal being transmitted at least from the terminal to the IC card after the IC card has started up. The receiving sensitivity for the data signal is set to be higher than the receiving sensitivity for the startup signal. The IC card can always receive the data signal normally after it has received the startup signal.

According to a second aspect of the present invention, there is provided a terminal for use with a non-contact IC card. The terminal starts up the non-contact IC card by transmitting a startup signal to the IC card. A data signal is transmitted at least from the terminal to the IC card after the IC card has been started up. The transmitting electromagnetic wave energy for transmitting the data signal is increased relative to the transmitting electromagnetic wave energy for transmitting the startup signal. The data signal can always be received normally by the non-contact IC card after the startup signal has been received by the IC card.

According to a third aspect of the present invention, there is provided a non-contact IC card system comprising a terminal and a non-contact IC card which starts up by receiving a startup signal from the terminal, a data signal being transmitted at least from the terminal to the IC card through electromagnetic waves after the IC card has been started up. In the non-contact IC card, the receiving sensitivity for the data signal is set to be higher than the receiving sensitivity for the startup signal. In the terminal, transmitting electromagnetic wave energy for transmitting the data signal is increased relative to transmitting electromagnetic wave energy for transmitting the startup signal. The data signal can always be transmitted and received normally by the non-contact IC card after the startup signal has been received by the IC card.

In the non-contact IC card in the first aspect of the present invention, the amplification factor of a receiving amplifier is changed or connections to two types of receiving coil antennas differing from each other in at least one of the number of turns, position, thickness, number and other factors are changed to increase the receiving sensitivity in a data communication step for transmitting the data signal relative to the receiving sensitivity in a startup step in which the startup signal for starting up the non-contact IC card is received. It is thereby ensured that the IC card can always receive the data signal normally after it has started up by receiving the startup signal.

In the non-contact IC card terminal in the second aspect of the present invention, the amplification factor of a transmitting amplifier is changed or connections to two types of transmitting coil antennas differing from each other in at least one of the number of turns, position, thickness, number and other factors are changed to increase the transmitting electromagnetic wave energy for transmitting the data signal relative to that for transmitting the startup signal. It is thereby ensured that that the non-contact IC card can always receive the data signal normally after it has started up by receiving the startup signal.

In the non-contact IC card system in the third aspect of the present invention, the amplification factor of a receiving amplifier is changed or connections to two types of receiving coil antennas differing from each other in at least one of the number of turns, position, thickness, number and other factors are changed to increase the receiving sensitivity in a data communication step for transmitting the data signal relative to the receiving sensitivity in a startup step in which the startup signal for, starting up the non-contact IC card is received, while the amplification factor of a transmitting amplifier is changed or connections to two types of transmitting coil antennas differing from each other in at least one of the number of turns, position, thickness, number and other factors are changed to increase the transmitting electromagnetic wave energy for transmitting the data signal relative to that for transmitting the startup signal. It is thereby ensured that the data signal can be transmitted and received normally after the non-contact IC card has started up by receiving the startup signal.

DESCRIPTION OF THE PREFERRED EMBODIMENTS

The preferred embodiments of the present invention will be described with reference to the drawings

Embodiment 1

Figure 1:
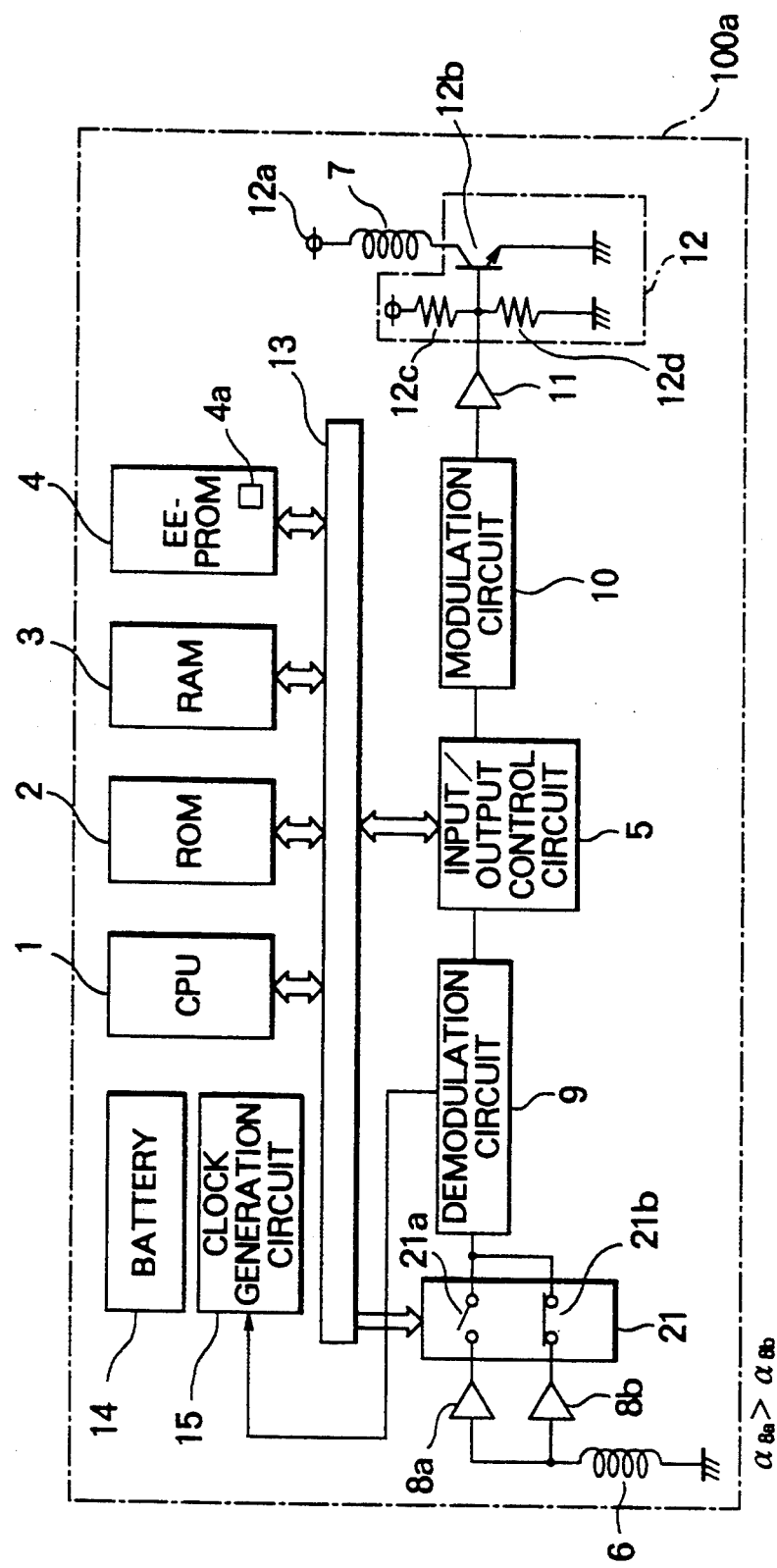
FIG. 1 is a block diagram of the construction of a non-contact IC card in accordance with a first embodiment of the present invention.

FIG. 1 is a block diagram of a non-contact IC card 100a in accordance with a first embodiment of the present invention. Components of the IC card 100a indicated by the reference characters 1 to 7 and 9 to 15 are the same as the corresponding components of the conventional IC card described above. In the IC card 100a, two receiving amplifiers 8a and 8b having different amplification factors are connected to a receiving coil antenna 6. In this embodiment, the amplification factor $\alpha_{8a}$ of the amplifier circuit 8a is greater than the amplification factor $\alpha_{8b}$ of the amplifier 8b ($\alpha_{8a} > \alpha_{8b}$). These amplifiers 8a and 8b are selectively connected to a demodulation circuit 9 by a selection circuit 21. The selection circuit 21 opens and closes selection switches 21a and 21b by being controlled by a CPU 1 to selectively connect the outputs from the amplifier circuits 8a and 8b to the demodulation circuit 9. A startup amplifier selection value and a data communication amplifier selection value for selecting one of the two amplifiers in a startup step of starting up the IC card or in a data communication step of performing data communication between the IC card and a terminal are stored in an area 4a of an EEPROM 4. In this embodiment, the selection values are set so that the CPU 1 selects the amplifier 8b having the smaller amplification factor in the startup step and selects the amplifier 8a having the larger amplification factor in the data communication step in order that the receiving sensitivity in the data communication step is higher than the receiving sensitivity in the startup step.

Figure 2:
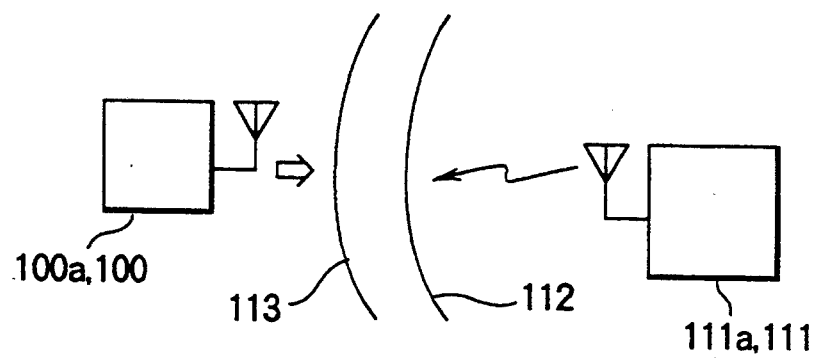
FIG. 2 is a block diagram of the relationship between the non-contact IC card and a terminal in accordance with the present invention.

FIG. 2 shows the relationship between a startup signal receivable area around a terminal 111 in which the IC card 100a of the invention having coil antennas can be started up by startup signal electromagnetic waves transmitted from the terminal 111 having internal coil antennas for communication with the IC card 100a, and a data signal receivable area in which the IC card 100a can receive data signal electromagnetic waves transmitted from the terminal 111. A limit line 112 represents a limit of the startup signal receivable area, while a limit line 113 represents a limit of the data signal receivable area. In FIG. 2 is illustrated a situation where a user carrying the IC card 100a approaches the terminal 111 having data communication functions, as indicated by the arrow, to enter the area in which the IC card 100a can receive electromagnetic waves transmitted from the terminal 111.

Figure 3:
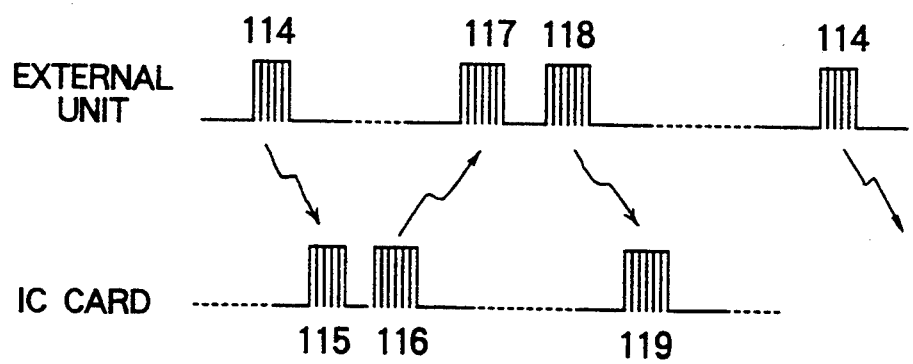
FIG. 3 is a diagram of an example of a procedure of communication between the non-contact IC card and the terminal.

FIG. 3 shows an example of a procedure of communication using electromagnetic waves between the IC card 100a and the terminal 111. A startup signal is generated as waveform 114 by the terminal 111. The startup signal is received as a waveform 115 by the IC card 100a. A waveform 116 represents a reply signal generated by the IC card 100a to inform the terminal 111 of startup of the IC card 100a. The reply signal is received as a waveform 117 by the terminal 111. A waveform 118 represents a data signal generated by the terminal 111 in response to the reply signal 117. The data signal is received as waveform 119 by the IC card 119.

In this embodiment, electromagnetic waves generated by the terminal 111 have the same intensity with respect to the startup signal 114 and the data signal 118.

The operation of this embodiment will be described below. Before the IC card 100a is actually used, amplifier selection values are first set in the area 4a of the EEPROM 4. For example, each selection value is set by a command from the terminal through the corresponding receiving amplifier selected by a default value previously programmed. In this embodiment, as mentioned above, the selection values are set so that the amplifier 8b having the smaller amplification factor is selected in the startup step, and the amplifier 8a having the larger amplification factor is selected in the data communication step, in order that the receiving sensitivity in the data communication step is higher than the receiving sensitivity in the startup step. That is, if values "A" and "B" designate the amplifiers 8a and 8b, respectively, "B" is set as the startup amplifier selection value while "A" is set as the data communication amplifier selection value. These selection values are set by a card manufacturer or a card publisher. The selection values are set under the control of the CPU 1. After the completion of setting, the CPU 1 reads out the startup amplifier selection value "B" previously set, opens the selection switch 21a of the selection circuit 21 and closes the selection switch 21b of the selection circuit 21 in accordance with the read value to connect the corresponding amplifier 8b to the demodulation circuit 9, as shown in FIG. 1. The IC card 100a is thereby set in a startup signal awaiting state (in which the internal clock is stopped and the operation can be restarted by a startup signal). The IC card 100a is used by being ordinarily carried by a user while being maintained in this state.

Next, the operation when a person who possesses the IC card passes, for example, through a gate (not shown) controlled by the terminal 111 as in the case of the conventional IC card will be described. In the terminal 111, startup signal 114 shown in FIG. 3 is generated at equal time intervals (e.g., at intervals of 50 to 100 ms). Startup signal 114 is repeatedly generated until the IC card 100a is thereby started up to perform data communication. As the IC card 100a is brought closer to the terminal 111, startup signal 115 is induced in the receiving coil antenna 6 in the IC card 100a by startup signal 114 and is input to the receiving amplifiers 8a and 8b. However, if the IC card 100a is located in the vicinity of the data signal receivable limit line 113, the amplifier 8b having the smaller amplification factor is selected and the level of the signal input to the demodulation circuit 9 is smaller than the desired level. In this case, therefore, the IC card 100a is not started up. When the IC card 100a enters the area inside the startup signal receivable limit line 112, the signal having the desired level is input from the amplifier 8b to the demodulation circuit 9. Only when the desired level is reached, does the CPU receive the startup signal 115.

When the CPU 1 receives startup signal 115, it sends reply signal 116 to a transmitting amplifier 11 through a modulation circuit 10 to inform the terminal 111 that the IC card has been started up. A drive circuit 12 switches on and off a transistor 12b to transmit reply signal 116 from a transmitting coil antenna 7 to the terminal 111. Simultaneously, the CPU 1, receiving startup signal 5, reads the data communication amplifier selection signal "A" in the area 4a of the EEPROM 4, and operates the selection circuit 21 in accordance with this selection value so that the amplifier 8a is connected to the demodulation circuit 9 while the amplifier 8b is disconnected from the demodulation circuit 9.

When the terminal 111 receives reply signal 117 from the IC card 100a, it then transmits to the IC card 100a data signal 118 necessary for data communication with the IC card 100a. The IC card 100a receives data signal 118 as data signal 119 through the receiving coil antenna 6. At this time, the receiving amplifier 8a has been selected having an amplification factor larger than that of the amplifier 8b which has received the startup signal. Therefore the data signal can be received reliably by the receiving amplifier 8a.

In the IC card 100a, the CPU 1 deciphers received data 119 and executes necessary control processing. If it is necessary for the IC card 100a to perform further data communication with the terminal 111, or if the terminal 111 includes a request for the continuation of further data communication in data signal 118 because of a need to continue communicating, the same reply signal as reply signal 116 is sent from the IC card 100a. The signal transmission between the IC card 100a and the terminal 111 is repeatedly performed in this manner to complete the desired communication. At the end of data communication, interpretation/determination results, for example, are transmitted from the IC card 100a to the terminal 111 and are deciphered in the terminal 111 to be collated with data previously set. If it is thereby determined that the deciphered data is correct, the gate opening/closing-controlled by the terminal 111 is opened by a permission signal from the terminal 111, and the IC card user is informed of the permission to pass through the gate by a normal display or a normal sound.

When data communication is finished, the CPU 1 reads the startup amplifier selection value "B" in the area 4a of the EEPROM 4 and operates the selection circuit 21 in accordance with this selection value so that the amplifier 8b is connected to the demodulation circuit 9 while the amplifier 8a is disconnected from the demodulation circuit 9. The CPU 1 sets the IC card in the startup signal waiting state again. The terminal 111 generates startup signal 114 again after a certain pause.

This operation will be described with respect to the startup signal and data signal communication distance between the IC card 100a and the terminal 111. Referring to FIG. 2, a startup signal and a data signal transmitted from the terminal 111 spread as represented by elliptic or spherical surfaces concentric with each other centered on the antenna coil of the terminal 111. Ordinarily, such startup and the data signals are transmitted at equal intensities.

In this embodiment, the amplification factor $\alpha_{8a}$ of the receiving amplifier 8a for amplifying a data signal at the time of reception in the IC card 100a is selected so as to be larger than that of the amplification factor $\alpha_{8b}$. Therefore, in a situation where the IC card 100a is brought closer to the terminal 111 as shown in FIG. 2, the limit line 112 representing the limit of the range in which a startup signal can be received is closer to the terminal 111 relative to the limit line 113 representing the limit of the range in which a data signal can be received. Naturally, under this condition, the IC card 100a can receive the data signal when located at a position such as to be able to receive the startup signal. Accordingly, there is no possibility of a data signal receiving failure after the IC card 100a has been started up by the startup signal from the terminal 111.

Embodiment 2

Figure 4:
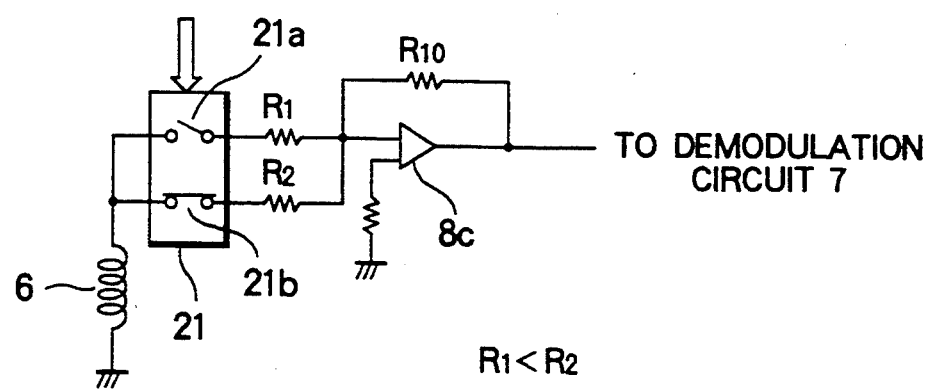
FIG. 4 is a block diagram of a receiving section of a non-contact IC card in accordance with a second embodiment of the present invention.

FIG. 4 shows a non-contact IC card in accordance with a second embodiment of the present invention. While in Embodiment 1 the two receiving amplifiers having different amplification factors are selectively connected by switching, this embodiment uses series resistors $R_1$ and $R_2$ of a receiving amplifier 8c selected to change the amplification factor. Only a portion of a receiving section of the IC card of this embodiment is illustrated in FIG. 4. Excepting this portion, the circuit of this embodiment is the same as that shown in FIG. 1. In this embodiment, the series resistors $R_1$ and $R_2$ of one receiving amplifier 8c are changed by switching of a selection circuit 21 to change the amplification factor G with respect to the startup step and the data communication step. When the series resistor $R_1$ (resistance value $R_1$) is selected, the amplification factor G of the amplifier 8c is represented by $G = R_{10}/R_1$ ($R_{10}$: the resistance value of a parallel resistor $R_{10}$). When the series resistor $R_2$ (resistance value $R_2$) is selected, the amplification factor G of the amplifier 8c is represented by $G = R_{10}/R_2$. Accordingly, if the resistance values of the series resistors R1 and R2 are in a relationship $R_1 < R_2$, the amplification factor G is larger when the series resistor $R_1$ is selected. Accordingly, in the IC card startup step, the on/off states of the selection switches 21a and 21b of the selection circuit 21 are controlled as shown in FIG. 4 to receive a startup signal through the series resistor $R_2$. In the data communication step, the selection switches 21a and 21b of the selection circuit 21 are changed to receive a data signal through the series resistor $R_1$. A startup signal receivable limit is thereby set closer to a terminal relative to a data signal receivable limit, and it is thereby ensured that the IC card 100a can receive a data signal accurately when located at a position for receiving a preceding startup signal, as in the case of Embodiment 1. In this embodiment, selection values are set in the area 4a of the EEPROM 4 in such a manner that if values "A" and "B" designate the series resistors $R_1$ and $R_2$, respectively, "B" is set as a startup series resistor selection value while "A" is set as a data communication series resistor selection value.

Embodiment 3

Figure 5:
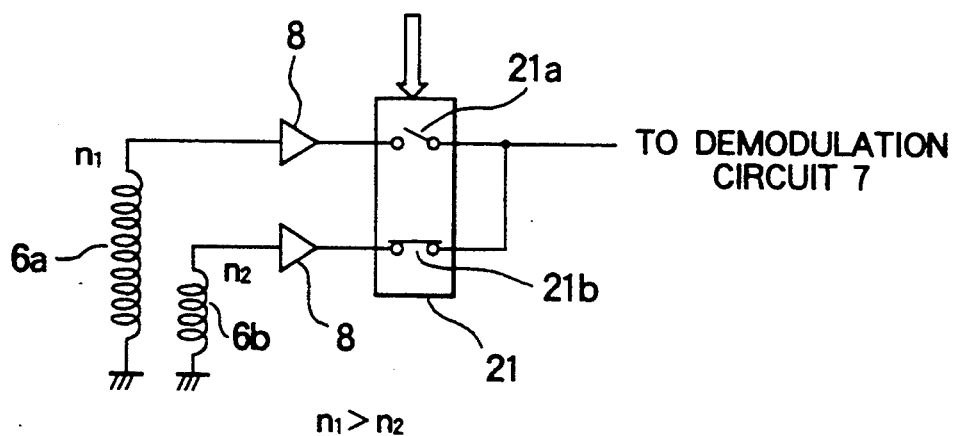
FIG. 5 is a block diagram of a receiving section of a non-contact IC card in accordance with a third embodiment of the present invention.

FIG. 5 shows a non-contact IC card in accordance with a third embodiment of the present invention. In this embodiment, two receiving coil antennas 6a and 6b having different numbers of turns are provided and are changed with respect to the startup step and the data communication step. Only a portion of a receiving section of the IC card of this embodiment is illustrated in FIG. 5. Excepting this portion, the circuit of this embodiment is the same as that shown in FIG. 1. Two receiving amplifiers 8 have equal amplification factors. Coils of the two receiving coil antennas 6a and 6b are formed of the same material and are equal in thickness. The numbers of turns $n_1$ and $n_2$ of these coils are selected so that $n_1 > n_2$. When electromagnetic waves from a terminal penetrate through the coil antennas 6a and 6b of the IC card, the electromotive force induced in the coil antenna 6a is larger than the electromotive force induced in the coil antenna 6b, since the electromotive forces induced in each coil antenna in the alternating magnetic field is generally proportional to the number of turns of the coil thereof, provided that the coil antennas have sufficiently small d.c. resistances such that the difference between their d.c. resistances is negligibly small. Accordingly, data is set in the area 4a of the EEPROM 4 so that the CPU 1 selects the coil antenna 6b in the startup step and selects the coil antenna 6a in the data communication step, thereby establishing a receiving limit relationship between a startup signal and a data signal as shown in FIG. 2, as in the case of the above-described embodiments. It is thereby ensured that the IC card 100a can receive a data signal normally when located at a position for receiving a preceding startup signal.

Embodiment 4

Figure 6:
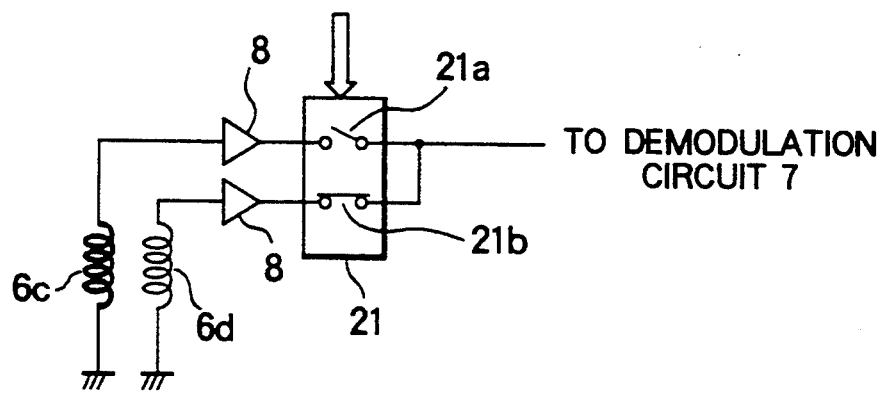
FIG. 6 is a block diagram of a receiving section of a non-contact IC card in accordance with a fourth embodiment of the present invention.

FIG. 6 shows a non-contact IC card in accordance with a fourth embodiment of the present invention. In this embodiment, two receiving coil antennas 6c and 6d differing in thickness are provided and are changed with respect to the startup step and the data communication step. Only a portion of a receiving section of the IC card of this embodiment is illustrated in FIG. 6. Excepting this portion, the circuit of this embodiment is the same as that shown in FIG. 1. Two receiving amplifiers 8 have equal amplification factors. Coils of the two receiving coil antennas 6c and 6d are formed of the same material and have equal numbers of turns, but the coil conductor forming the coil antenna 6c is thicker than that of the coil antenna 6d. The electrical resistance of the coil antenna 6c is smaller than that of the coil antenna 6d in inverse relationship to the sectional area of the coil antenna 6c conductor. Therefore, when the coil antennas 6c and 6d receive electromagnetic waves from a terminal, the electromotive force generated in the coil antenna 6c is larger than the electromotive force generated in the coil antenna 6d. Accordingly, data is set in the area 4a of the EEPROM 4 so that the CPU 1 selects the coil antenna 6d in the startup step and selects the coil antenna 6c in the data communication step, thereby establishing a receiving limit relationship between a startup signal and a data signal as shown in FIG. 2, as in the case of the above-described embodiments. It is thereby ensured that the IC card 100a can receive a data signal normally when located at a position for receiving a preceding startup signal.

Embodiment 5

Figure 7:
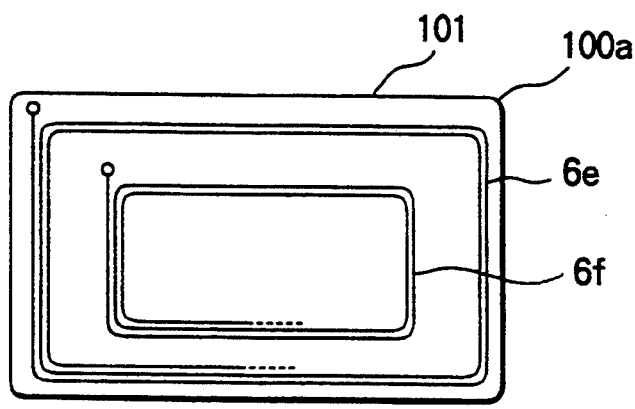
FIG. 7 is a diagram of the arrangement of receiving coil antennas of a non-contact IC card in accordance with a fifth embodiment of the present invention.
Figure 8:
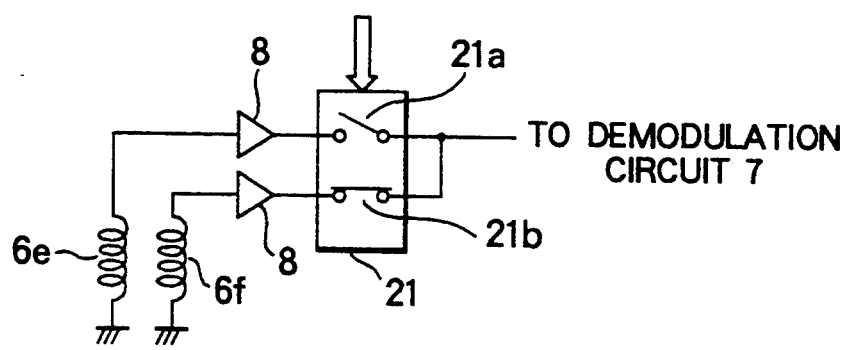
FIG. 8 is a block diagram of a receiving section of the non-contact IC card of FIG. 7.

FIGS. 7 and 8 show a non-contact IC card in accordance with a fifth embodiment of the present invention. In this embodiment, two receiving coil antennas 6e and 6f formed of the same material and having equal numbers of turns are formed on inner and outer portions of a printed circuit board 101 of the IC card, and are changed with respect to the startup step and the data communication step. FIG. 7 schematically shows the arrangement of the receiving coil antennas 6e and 6f in the IC card 100a, and FIG. 8 shows the arrangement of a receiving section of the IC card 100a. Excepting this portion, the circuit of this embodiment is the same as that shown in FIG. 1. Two receiving amplifiers 8 have equal amplification factors. In general, an IC card coil antenna is formed as a spiral pattern of copper foil or the like by etching on a printed circuit board on which circuit components are mounted. In this embodiment, the receiving coil antenna 6e is formed on an outer portion of the circuit board while the receiving coil antenna 6f is formed on an inner portion of the circuit board inside the receiving coil antenna 6e. The coil antennas 6e and 6f are formed of the same material and have equal numbers of turns. When the coil antennas 6e and 6f thus formed receive electromagnetic waves of equal magnitudes from a terminal, the electromotive force generated in the outer coil antenna 6e is larger than the electromotive force generated in the inner coil antenna 6f. Accordingly, data is set in the area 4a of the EEPROM 4 so that the CPU 1 selects the coil antenna 6f in the startup step of receiving a startup signal and selects the coil antenna 6e in the data communication step of receiving a data signal, thereby establishing a receiving limit relationship between a startup signal and a data signal as shown in FIG. 2, as in the case of the above-described embodiments. It is thereby ensured that the IC card 100a can receive a data signal normally when located at a position for receiving a preceding startup signal.

Embodiment 6

Figure 9:
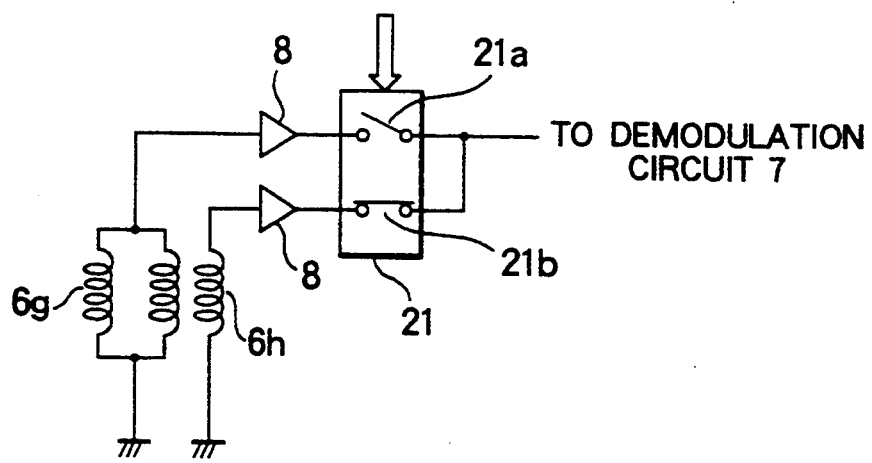
FIG. 9 is a block diagram of a receiving section of a non-contact IC card in accordance with a sixth embodiment of the present invention.

FIG. 9 shows a non-contact IC card in accordance with a sixth embodiment of the present invention. In this embodiment are provided a receiving coil antenna 6h formed of one coil and a receiving coil antenna 6g which is formed in such a manner that two coils each formed of the same material and having the same size as the coil of the receiving coil antenna 6h are connected in parallel with each other. The receiving coil antenna 6g having a higher receiving sensitivity is used in the data communication step. Two amplifiers 8 have equal amplification factors. Through the receiving coil antenna 6g, a stronger received signal can be obtained because electromotive forces generated in the two coils are combined. Accordingly, the receiving coil antenna 6h including one coil is selected in the startup step and the receiving coil antenna 6g formed of a parallel connection of two coils is selected in the data communication step, thereby establishing a receiving limit relationship between a startup signal and a data signal as shown in FIG. 2, as in the case of the above-described embodiments. It is thereby ensured that the IC card 100a can receive a data signal normally when located at a position such as to be able to receive a preceding startup signal.

Embodiment 7

Figure 10:
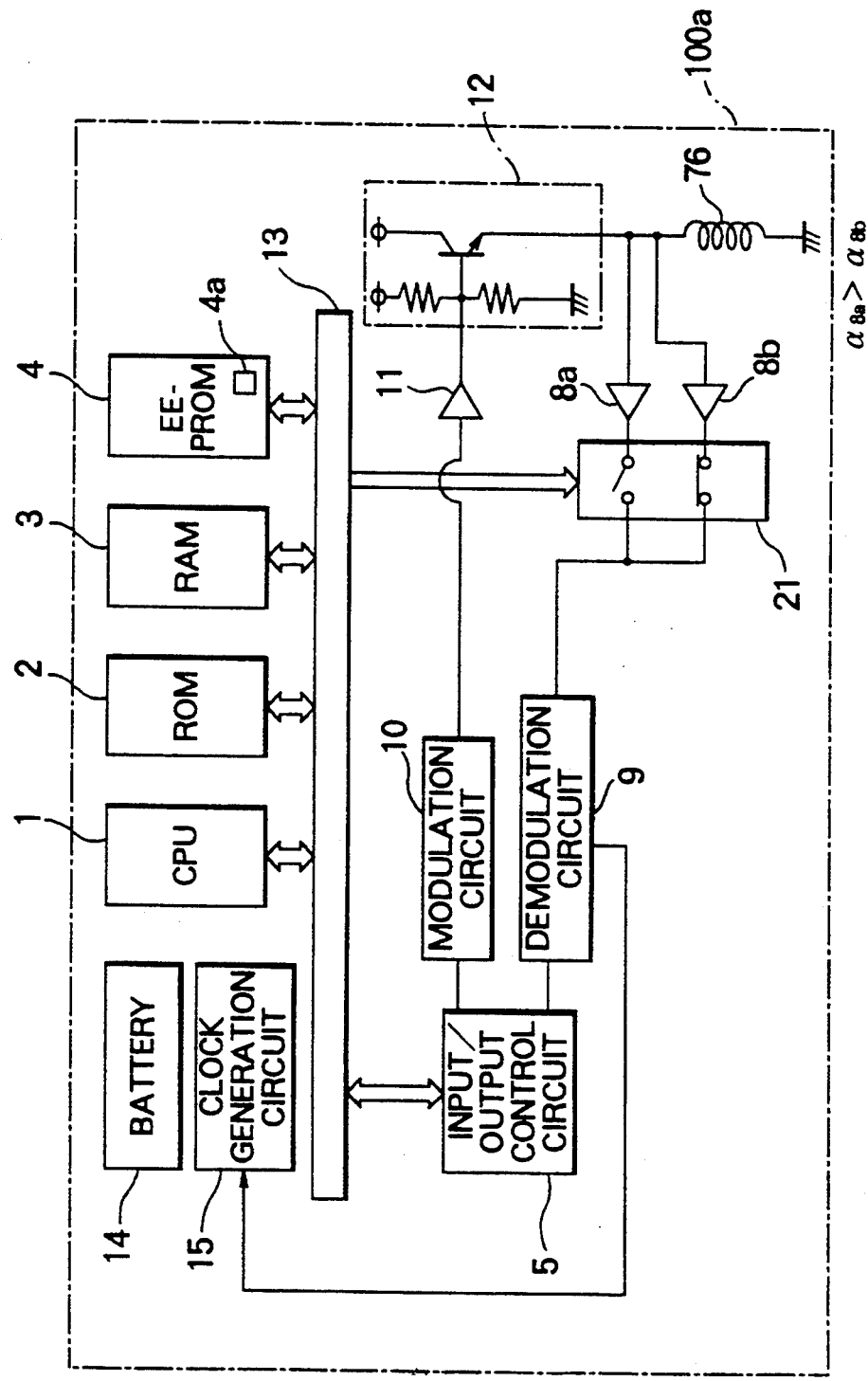
FIG. 10 is a block diagram of the construction of a non-contact IC card in accordance with a seventh embodiment of the present invention.

The IC cards having coil antennas separately used for receiving and transmitting have been described as embodiments of the present invention. However, the same effect can also be achieved by applying the invention to an IC card having one coil antenna used both for receiving and for transmitting. FIG. 10 shows an embodiment of the present invention in which the arrangement of Embodiment 1 shown in FIG. 1, for example, is applied to an IC card having one transmitting/receiving coil antenna 76 used both for receiving and for transmitting. Also in this embodiment, the same effect of the invention can be achieved.

A transmission system in which a terminal sends a data signal after confirming a reply signal from an IC card was adopted for the above-described embodiments, but this is not exclusive. For example, a transmitting system may be used in which a terminal sends a data signal successively after sending a startup signal and recognizes a startup of an IC card and interprets interpretation/determination results from the IC card on the basis of a signal representing final interpretation/determination results and other data transmitted from the IC card. Reliable data communication is possible one the IC card is started up and the desired effect can be achieved.

Non-contact IC cards have been described as embodiments of the present invention. Next, terminals arranged for communication with non-contact IC cards in accordance with the second aspect of the present invention will be described.

Embodiment 8

Figure 11:
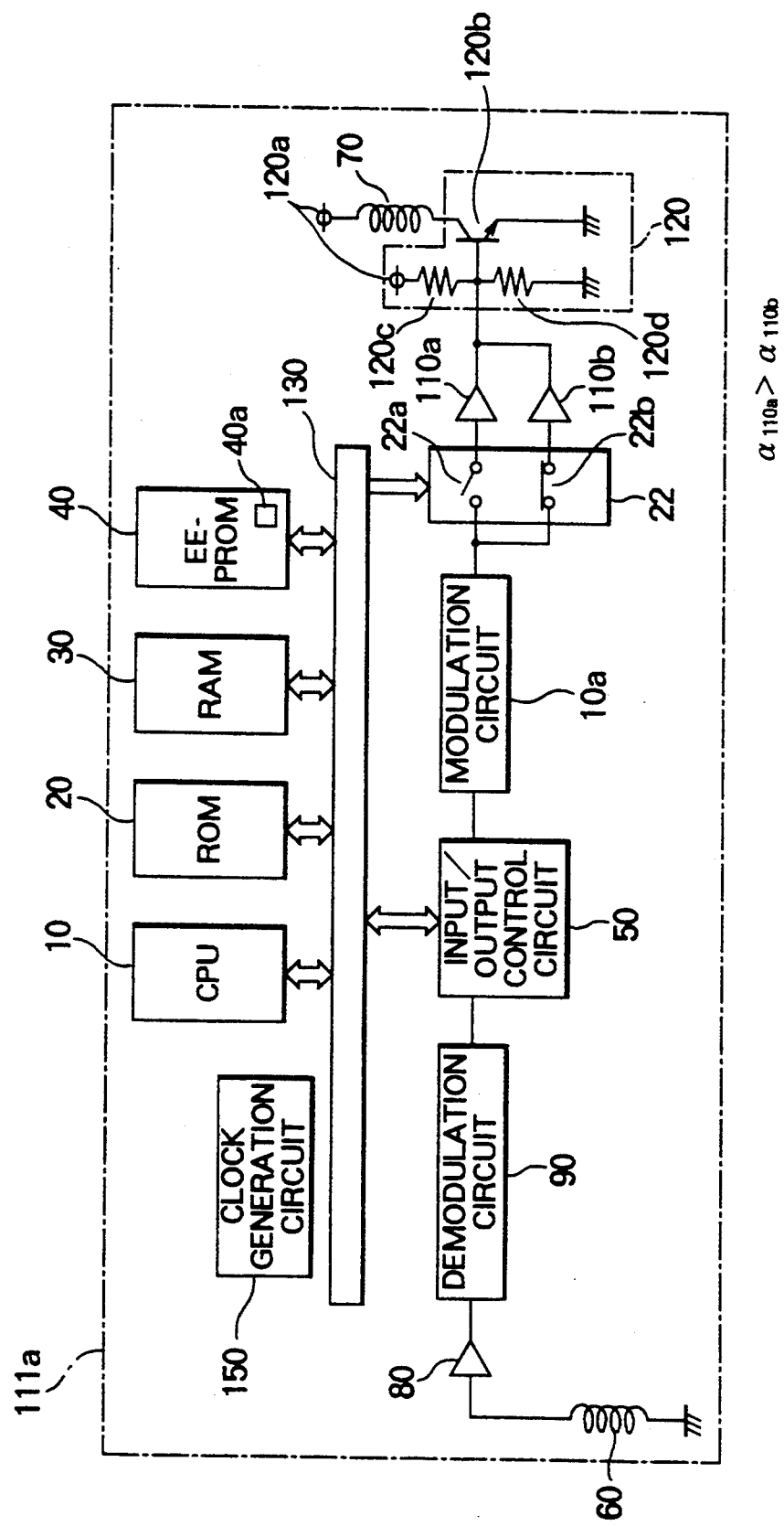
FIG. 11 is a block diagram of the construction of a non-contact IC card terminal in accordance with an eighth embodiment of the present invention.

FIG. 11 is a block diagram of a non-contact IC card terminal 111a in accordance with an eighth embodiment. The terminal 111a has basically the same internal construction as the non-contact IC card of the invention. Various memories, i.e., a ROM 20, a RAM 30 and an EEPROM 40, are connected through a bus 130 to a CPU 10 for controlling the operation of the terminal 111a. The ROM 20 is a non-volatile memory for storing a program executed by the CPU 10, the RAM 30 is a volatile memory for storing processing results or the like, and the EEPROM 40 is a rewritable non-volatile memory for storing data to be specially preserved, for example, attribute information of a card. An input/output control circuit 50 for controlling the operation of receiving data from an IC card and outputting data to the IC card is also connected to the bus 130. A receiving coil antenna 60 and a transmitting coil antenna 70 are connected to the input/output control circuit 50° The receiving coil antenna 60 is connected through a receiving amplifier 80 and a demodulation circuit 90, while the transmitting coil antenna 70 is connected through a modulation circuit 10a, a selection circuit 22, transmitting amplifiers 110a and 110b and a drive circuit 120. A block 150 represents a clock generation circuit for supplying a clock signal to portions of the circuit. The drive circuit 120 has a power supply terminal 120a through which electric power is supplied from a terminal power source (not shown), a transistor 120b, and resistors 12c and 12d. This drive circuit operates in the same manner as the drive circuit 12 in IC cards.

In the terminal 111a, the transmitting amplifiers 110a and 110b having different amplification factors are connected to the drive circuit 120. The amplification factor $\alpha_{110a}$ of the amplifier 110a is larger than the amplification factor $\alpha_{110b}$ of the amplifier 110b ($\alpha_{110a} > \alpha_{110b}$). The amplifiers 110a and 110b are selectively connected between the modulation circuit 10a and the drive circuit 120 by the selection circuit 22 to amplify a signal from the modulation circuit 10a. The selection circuit 22 opens and closes selection switches 22a and 22b under the control of the CPU 10 to selectively connect the output from the modulation circuit 10a to the transmitting amplifier 110a or 110b. Selection values for designating one of the amplifiers to be selected in the startup step or data communication step by the same method as that for the above-described IC card of the present invention are stored in an area 40a of the EEPROM 40. In this embodiment, the selection values are set so that the CPU 10 selects the amplifier 110b having the smaller amplification factor in the startup step and selects the amplifier 110a having the larger amplification factor in the data communication step in order that the transmitting electromagnetic wave energy in the data communication step is larger than the transmitting electromagnetic wave energy in the startup step. This selection value setting is performed, for example, by a command under the control of the CPU 10, as in the case of the above-described IC card of the present invention.

The operation of this terminal will be described with reference to FIGS. 11, 2, and 3. When a startup signal is transmitted from the terminal 111a to an IC card 100, the CPU 10 selects the amplifier 110b having the smaller amplification factor in accordance with the selection values set in the area 40a of the EEPROM 40, opens the selection switch 22a of the selection circuit 22 and closes the selection switch 22b of the selection circuit 22, as shown in FIG. 11. A startup signal from the modulation circuit 10a is amplified by the amplifier 110b, and startup signal 114 (see FIG. 3) in the form of electromagnetic waves is transmitted through the transmitting coil antenna 70 by the on/off operation of the transistor 120b of the drive circuit 120 in accordance with the amplified signal. However, if the IC card 100 is in the vicinity of a data signal reception limit as represented by the limit line 113 in FIG. 2, the transmitting electromagnetic wave energy of the startup signal is small and the IC card 100 is not started up. If the IC card 100 is brought closer to the terminal 111a within a startup signal reception limit as represented by the limit line 112 in FIG. 2, a startup signal having the desired level can startup the IC card 100. Then, the IC card 100 sends back reply signal 116 indicating that the IC card 100 has been started up.

When reply signal 117 (see FIG. 3) from the IC card 100 is received by the terminal 111a, the CPU 10 operates the selection circuit 22 in accordance with the selection values in the area 40a of the EEPROM 40 to change the transmitting amplifier from the amplifier 110b to the amplifier 110a. Thereafter, a data signal data for communication with the IC card 100 is amplified by the amplifier 110a and is transmitted as data signal 118 to the IC card 100. The IC card 100 receives data signal 118 as data signal 119. At this time, the transmitting amplifier of the terminal 111a has been changed from the amplifier 110b which has received the startup signal to the amplifier 110a having the larger amplification factor, as mentioned above. The level of data signal 118 is therefore higher than that of startup signal 114, and the IC card can receive the data signal reliably.

In this embodiment, with respect to transmission from the terminal 111a, the amplification factor $\alpha_{110a}$ of the transmitting amplifier 110a for amplifying a data signal is larger than the amplification factor $\alpha_{110b}$ of the transmitting amplifier 110b for amplifying a startup signal. Accordingly, the transmitting electromagnetic wave energy of a data signal transmitted from the transmitting coil antenna 70 of the terminal 111a is larger than the transmitting electromagnetic wave energy of a preceding startup signal. Therefore, with respect to the terminal 111a, a limit of a data signal transmittable area as represented by the limit line 113 in FIG. 2 is more remote than a limit of a startup signal transmittable area as represented by the limit line 112. In other words, the limit line 112 of the area in which the IC card 100 can receive a startup signal is closer to the terminal 111a than the limit line 113 of the area in which the IC card 100 can receive a subsequent data signal therefore it is certain that the IC card can receive the data signal when located at a position for receiving the startup signal. Thus, it is ensured that data communication can be performed without failure once the IC card 100 is started up by a startup signal from the terminal 111a.

Embodiment 9

Figure 12:
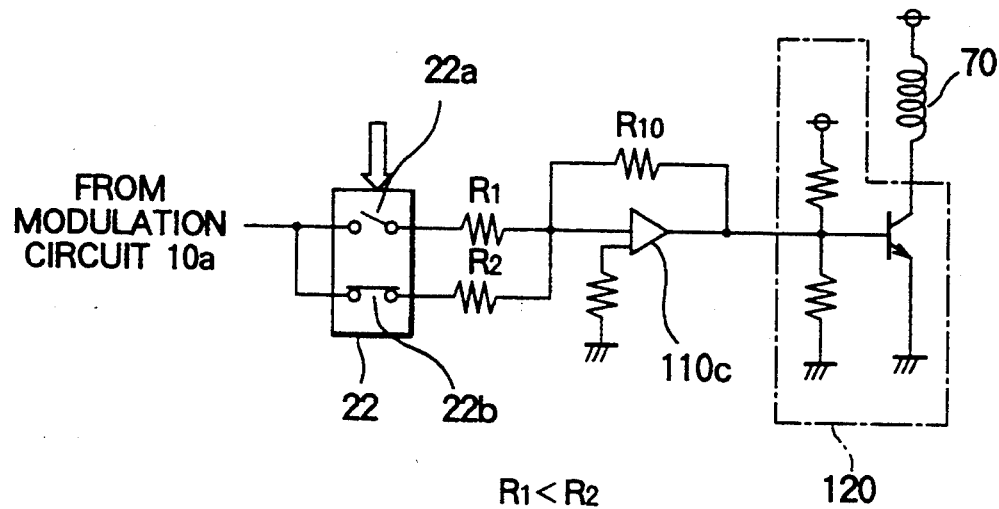
FIG. 12 is a block diagram of a transmitting section of a non-contact IC card terminal in accordance with a ninth embodiment of the present invention.

FIG. 12 shows a terminal in accordance with a ninth embodiment of the present invention. While in Embodiment 8 the two transmitting amplifiers having different amplification factors are selectively connected by switching, this embodiment uses series resistors $R_1$ and $R_2$ of a transmitting amplifier 110c selected to change the amplification factor. Only a portion of a transmitting section of the terminal of this embodiment is illustrated in FIG. 12. Excepting this portion, the circuit of this embodiment is the same as that shown in FIG. 11.

In this embodiment, the series resistors $R_1$ and $R_2$ of one transmitting amplifier 110c are changed by switching of the selection circuit 22 to change the amplification factor G with respect to the startup step and the data communication step. When the series resistor $R_1$ (resistance value $R_1$) is selected, the amplification factor G of the amplifier 110c is represented by $G=R_{10}/R_1$ ($R_{10}$: the resistance value of a parallel resistor $R_{10}$). When the series resistor $R_2$ (resistance value $R_2$) is selected, the amplification factor G of the amplifier 110c is represented by $G=R_{10}/R_2$. Accordingly, if the resistance values of the series resistors $R_1$ and $R_2$ are in a relationship $R_1<R_2$, the amplification factor G is larger when the series resistor $R_1$ is selected. Accordingly, in the startup step, the on/off states of the selection switches 22a and 22b of the selection circuit 22 are controlled as shown in FIG. 12 to transmit a startup signal through the series resistor $R_2$. In the data communication step, the selection switches 22a and 22b of the selection circuit 22 are changed to transmit a data signal through the series resistor $R_1$. A startup signal receivable limit of the IC card 100 is thereby set closer to the terminal relative to a data signal receivable limit, and it is thereby ensured that the IC card 100 can receive a data signal accurately when located at a position for receiving a preceding startup signal, as in the case of Embodiment 8.

Embodiment 10

Figure 13:
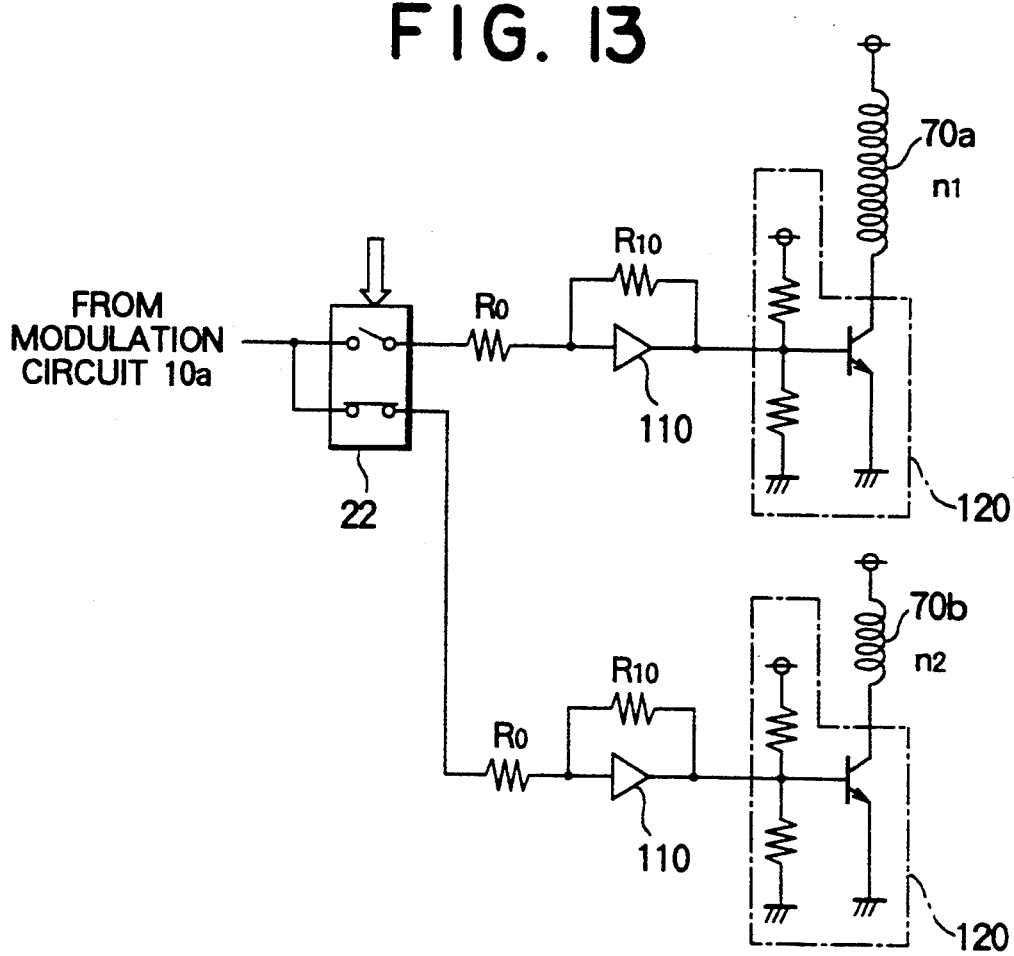
FIG. 13 is a block diagram of a transmitting section of a non-contact IC card terminal in accordance with a tenth embodiment of the present invention.

FIG. 13 shows a terminal in accordance with a tenth embodiment of the present invention in the second aspect of the invention. In this embodiment, two transmitting coil antennas 70a and 70b having different numbers of turns are provided and are changed with respect to the startup step and the data communication step. Only a portion of a transmitting section of the terminal of this embodiment is illustrated in FIG. 13. Excepting this portion, the circuit of this embodiment is the same as that shown in FIG. 11. Coils of the two transmitting coil antennas 701 and 70b are formed of the same material and are equal in thickness. The numbers of turns $n_1$ and $n_2$ of these coils are selected so that $n_1>n_2$. Two amplifiers 110 have equal amplification factors and two drive circuits 120 have equal driving functions. When equal alternating currents are caused to flow through the coils of the coil antennas 70a and 70b, the electromagnetic wave energy generated by the coil antenna 70a is larger than the electromagnetic wave energy generated by the coil antenna 70b, since the electromagnetic wave energy generated by each coil antenna is generally proportional to the number of turns of the coil thereof, provided that the coil antennas have sufficiently small d.c. resistances such that the difference between their d.c. resistances is negligibly small. Accordingly, the selection circuit 22 is switched so that the coil antenna 70b is selected in the startup step while the coil antenna 70a is selected in the data communication step, thereby establishing a receiving limit relationship between a startup signal and a data signal as shown in FIG. 2, as in the case of the above-described embodiments. It is thereby ensured that the IC card 100 can receive a data signal normally when located at a position for receiving a preceding startup signal.

Embodiment 11

Figure 14:
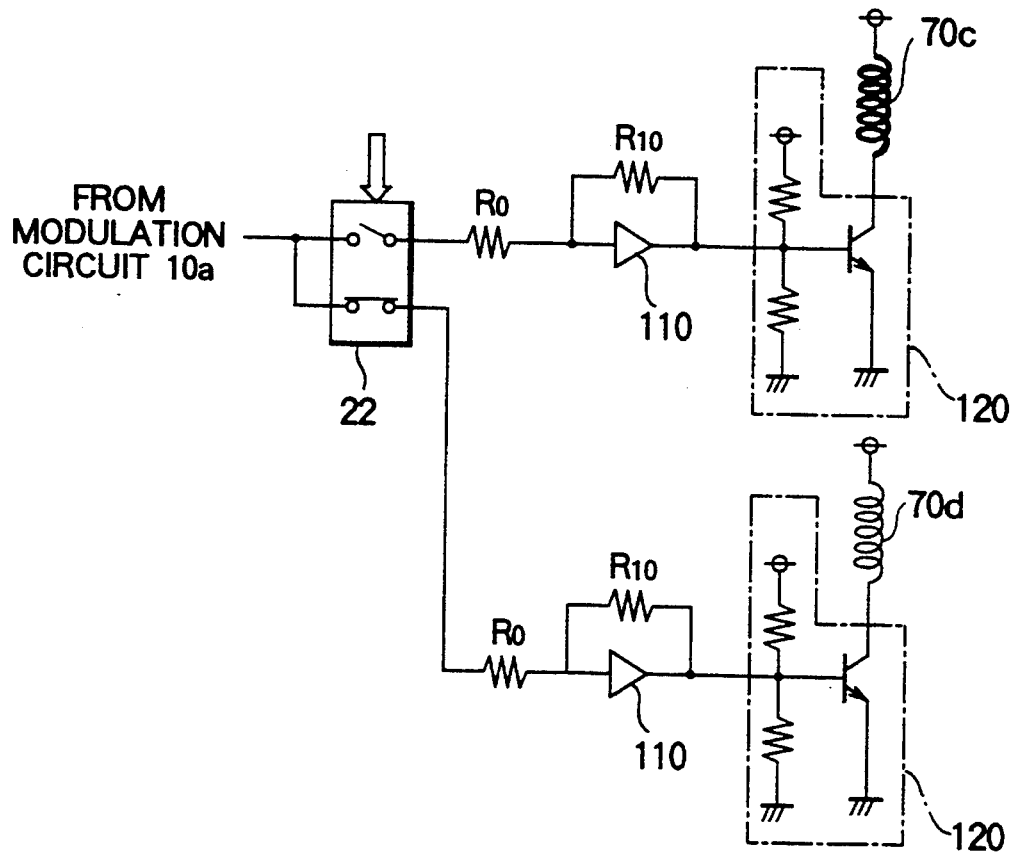
FIG. 14 is a block diagram of a transmitting section of a non-contact IC card terminal in accordance with an eleventh embodiment of the present invention.

FIG. 14 shows a terminal in accordance with an eleventh embodiment of the present invention. In this embodiment, two transmitting coil antennas 70c and 70d differing in thickness are provided and are changed with respect to the startup step and the data communication step. Only a portion of a transmitting section of the terminal of this embodiment is illustrated in FIG. 14. Excepting this portion, the circuit of this embodiment is the same as that shown in FIG. 11. Coils of the two transmitting coil antennas 70c and 70d are formed of the same material and have equal numbers of turns, but the coil conductor forming the coil antenna 70c is thicker than that of the coil antenna 70d. Two amplifiers 110 have equal amplification factors and two drive circuits 120 have equal driving functions. The electrical resistance of the coil antenna 70c is smaller than that of the coil antenna 70d in inverse relationship to the sectional area of the coil antenna 70c conductor relative to the coil antenna 70d conductor. Therefore, when equal currents are caused to flow through the coil antennas 70c and 70d, the electromagnetic wave energy generated by the coil antenna 70c is larger than the electromagnetic wave energy generated by the coil antenna 70d. If switching of the selection circuit 22 is controlled so that the coil antenna 70d is selected in the startup step while the coil antenna 70c is selected in the data communication step, a receiving limit relationship between a startup signal and a data signal as shown in FIG. 2 can be established, as in the case of the above-described embodiments. It is thereby ensured that the IC card 100 can receive a data signal normally when located at a position for receiving a preceding startup signal.

Embodiment 12

Figure 15:
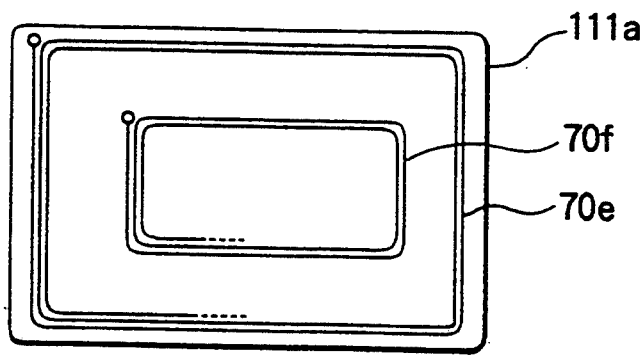
FIG. 15 is a diagram of the arrangement of transmitting coil antennas of a non-contact IC card terminal in accordance with a twelfth embodiment of the present invention.
Figure 16:
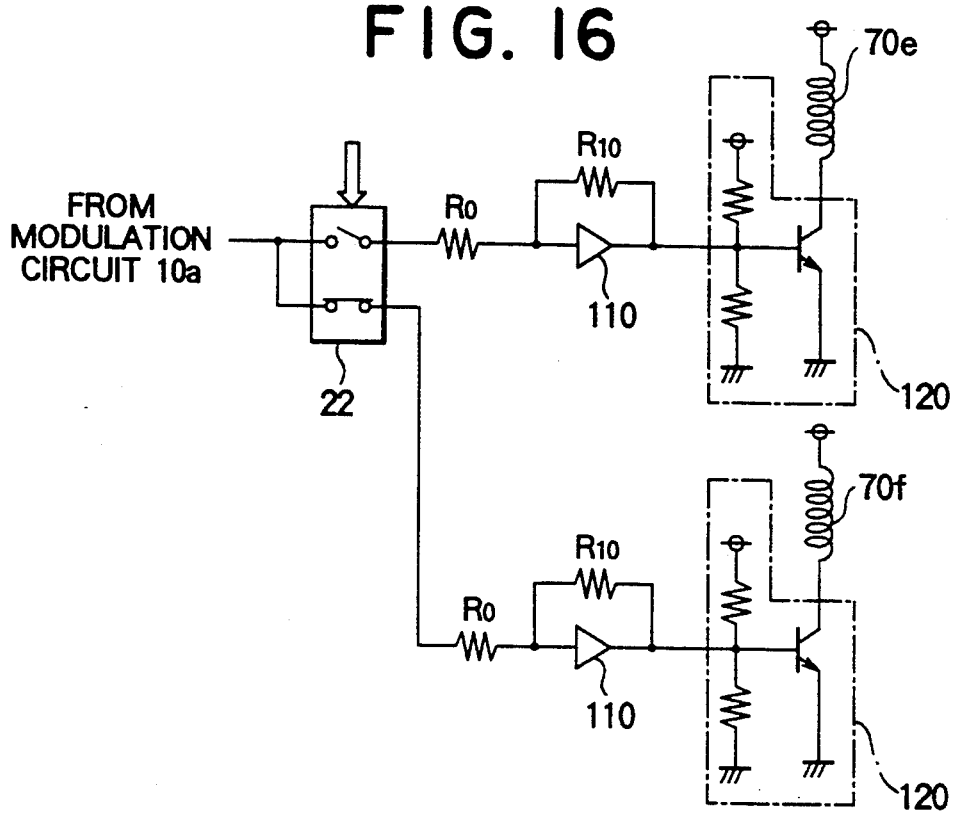
FIG. 16 is a block diagram of a transmitting section of the non-contact IC card terminal of FIG. 15.

FIGS. 15 and 16 show a terminal in accordance with a twelfth embodiment of the present invention in the second aspect of the invention. In this embodiment, two transmitting coil antennas 70e and 70f formed of the same material and having equal numbers of turns are formed on inner and outer portions of a printed circuit board or the like of the terminal 111a, and are changed with respect to the startup step and the data communication step. FIG. 15 schematically shows the arrangement of the transmitting coil antennas 70e and 70f on the printed circuit board of the terminal 111a of this embodiment, and FIG. 16 shows the arrangement of a receiving section of the terminal 111a. Excepting this portion, the circuit of this embodiment is the same as that shown in FIG. 11. In this embodiment, the transmitting coil antenna 70e is on an outer portion of the circuit board while the transmitting coil antenna 70f is on an inner portion of the circuit board inside the transmitting coil antenna 70e. The coil antennas 70e and 70f are formed of the same material and have equal numbers of turns. By this arrangement, the outer coil antenna 70e can have a larger than electromagnetic wave energy in comparison with the inner coil antenna 70f. Accordingly, switching of the selection circuit 22 is controlled so that the coil antenna 70d is selected in the startup step while the coil antenna 70c is selected in the data communication step, thereby establishing a receiving limit relationship between a startup signal and a data signal as shown in FIG. 2, as in the case of the above-described embodiments. It is thereby ensured that the IC card 100 can receive a data signal normally when located at a position for receiving a preceding startup signal.

Embodiment 13

Figure 17:
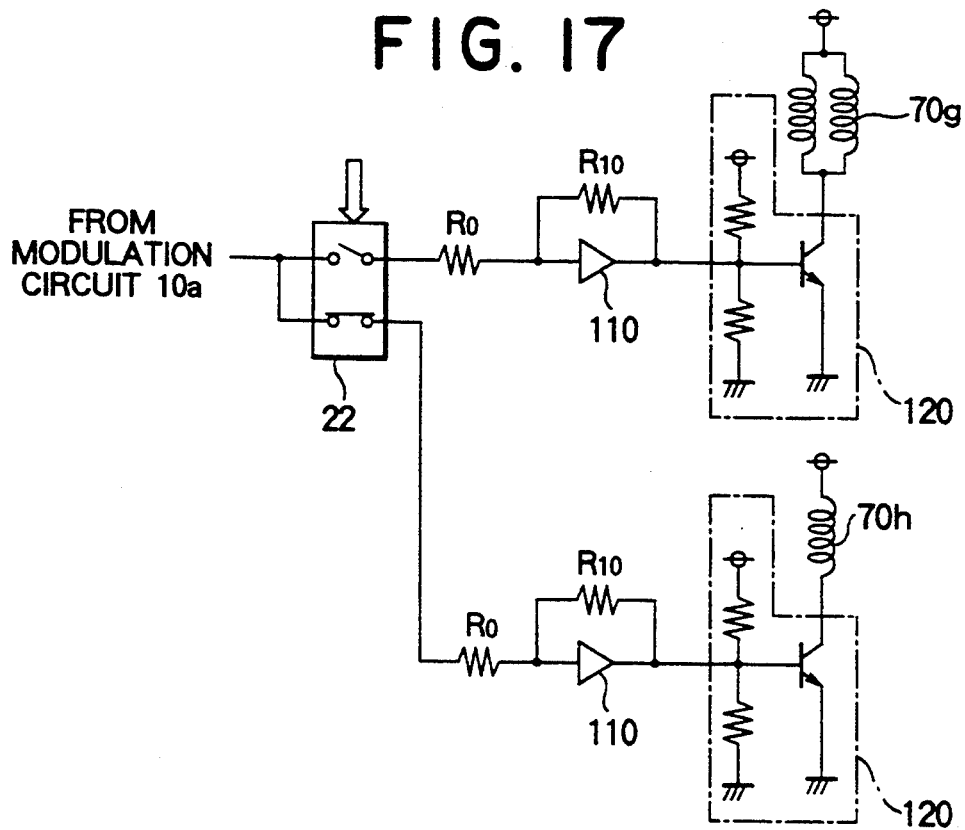
FIG. 17 is a block diagram of a transmitting section of a non-contact IC card terminal in accordance with a thirteenth embodiment of the present invention.

FIG. 17 shows a terminal in accordance with a thirteenth embodiment of the present invention. In this embodiment are provided a transmitting coil antenna 70h formed of one coil a transmitting coil antenna 70g is two coils formed of the same material and having the same size as the coil of the transmitting coil antenna 70h connected in parallel with each other. The transmitting coil antenna 70g capable of producing larger transmitting electromagnetic wave energy is used in the data communication step. Two amplifiers 110 have equal amplification factors and two drive circuits 120 have equal driving functions. A coil antenna has a characteristic such that when an alternating current flows through the coil of the antenna, it flows through a portion closer to the surface of the coil because of the skin effect. Therefore, an alternating current can flow more easily through parallel coils than in an equivalent single coil. Accordingly, as in the case of the above-described embodiments, a receiving limit relationship between a startup signal and a data signal as shown in FIG. 2 can be established by selecting the transmitting coil antenna 70h in the startup step and by selecting the transmitting coil antenna 70g. It is thereby ensured that the IC card 100 can receive a data signal normally when located at a position for receiving a preceding startup signal.

Embodiment 14

Figure 18:
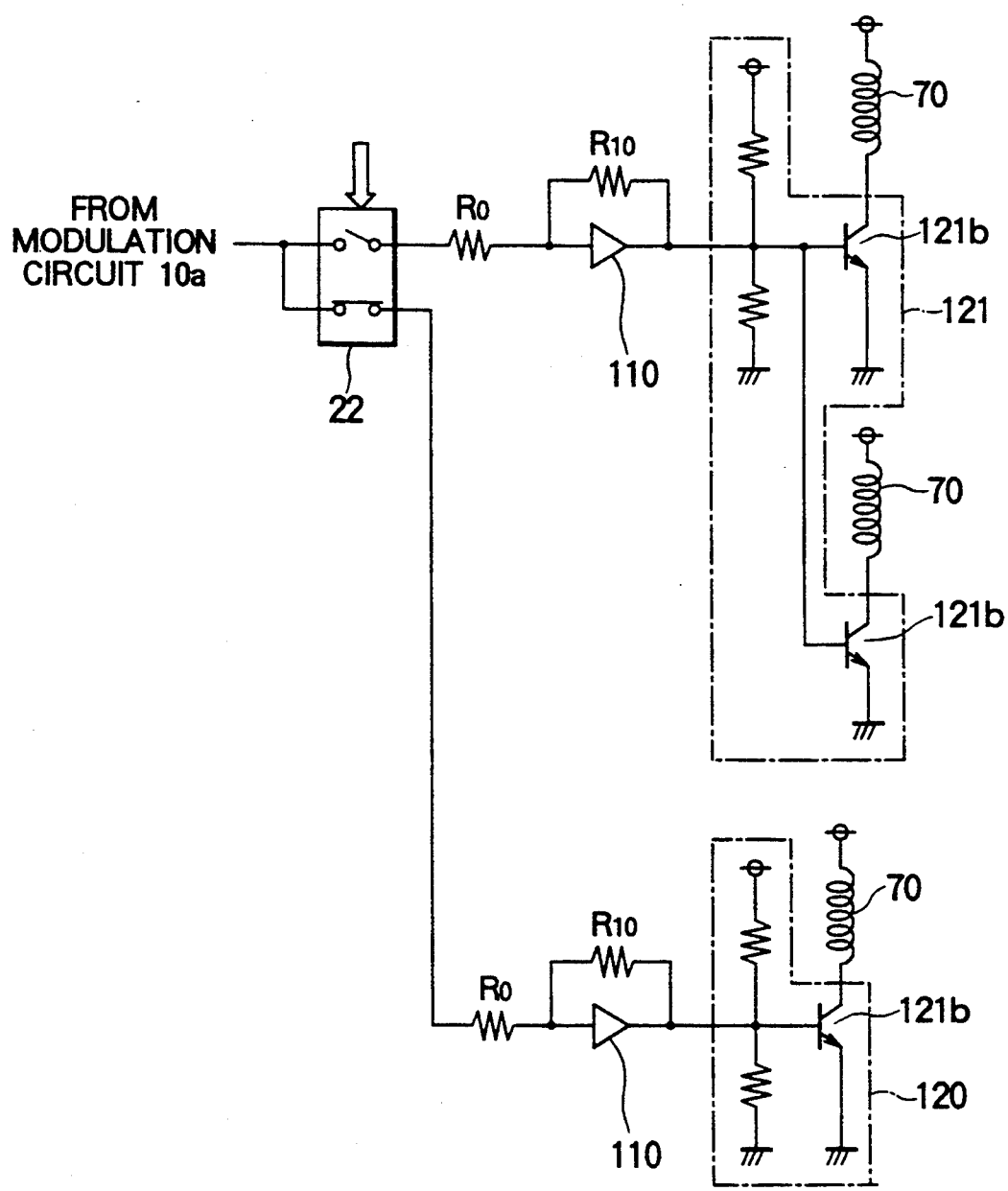
FIG. 18 is a block diagram of a transmitting section of a non-contact IC card terminal in accordance with a fourteenth embodiment of the present invention.

FIG. 18 shows a terminal in accordance with a fourteenth embodiment of the present invention. In this embodiment are provided a circuit section consisting of one transmitting coil antenna 70 and one drive circuit 120, and another circuit section consisting of two transmitting coil antennas and a drive circuit 121 having transistors 121b for driving the coils. The latter circuit section is capable of producing electromagnetic waves having higher energy and is used in the data communication step. Accordingly, as in the case of the above-described embodiments, a receiving limit relationship between a startup signal and a data signal as shown in FIG. 2 can be established by selecting the circuit section having one transmitting coil 70 in the startup step and by selecting the circuit section having two transmitting coil antennas 70 in the data communication step. It is thereby ensured that the IC card 100 can receive a data signal normally when located at a position for receiving a preceding startup signal.

Embodiment 15

Figure 19:
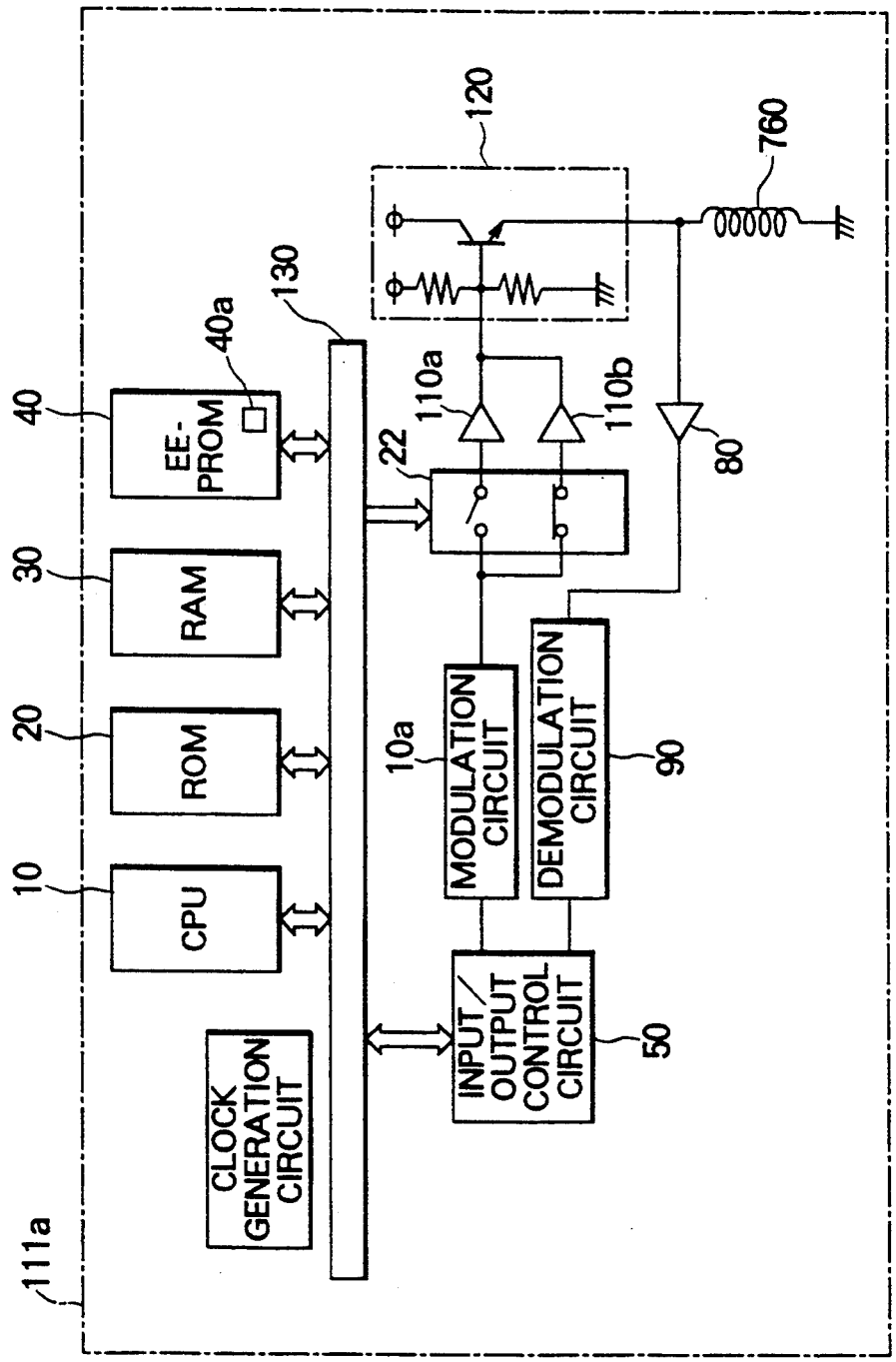
FIG. 19 is a block diagram of a transmitting section of a non-contact IC card terminal in accordance with a fifteenth embodiment of the present invention.
Figure 20:
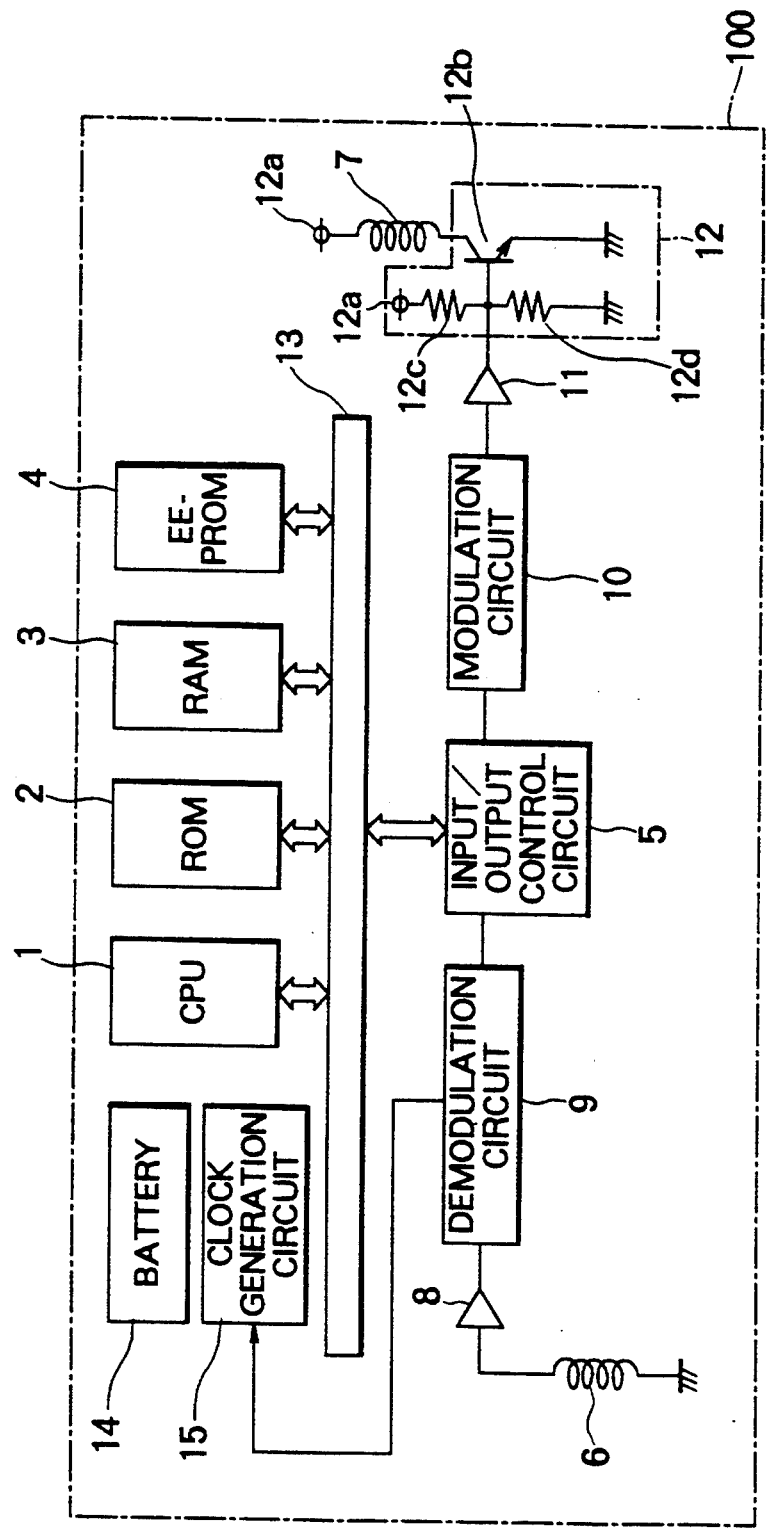
FIG. 20 is a schematic block diagram of the construction of a conventional non-contact IC card.

The terminals having coil antennas separately used for receiving and transmitting have been described as embodiments of the present invention. However, the same effect can also be achieved by applying the invention to a terminal having one coil antenna used both for receiving and for transmitting. FIG. 19 shows an embodiment of the present invention in which the arrangement of Embodiment 8 shown in FIG. 11, for example, is applied to a terminal having one transmitting/receiving coil antenna 760 used both for receiving and for transmitting. Also in this embodiment, the same effect of the invention can be achieved.

The non-contact IC cards in which the data signal receiving sensitivity is higher than the startup signal sensitivity were described as embodiments aspect of the invention, and the non-contact IC card terminals in which the transmitting electromagnetic wave energy of a data signal is larger than the electromagnetic wave energy of a startup signal were described as embodiments of the invention. The present invention also includes a non-contact IC card system based on a combination of one of the non-contact IC cards of Embodiments 1 to 7 of the invention and one of the non-contact IC card terminals of Embodiments 8 to 16 of the invention. In the non-contact IC card system according of the invention, a non-contact IC card in which the data signal receiving sensitivity is increased relative to the startup signal receiving sensitivity and a terminal in which the transmitting electromagnetic wave energy of a data signal is increased relative to the electromagnetic wave energy of a startup signal are combined to further improve the effect of always normally receiving a data signal when the IC card is at a startup signal receivable position in comparison with the effect of the invention in the first and second aspects.

The non-contact IC card the non-contact IC card terminal of the invention are not limited to the above-described embodiments. Any other modifications can be made in accordance with the present invention, for example, by changing the amplification factor of an amplifier or by selecting connections to two types of coil antennas differing from each other in at least one of number of turns, position, thickness, number and other factors so that the data signal receiving sensitivity is higher than the startup signal receiving sensitivity, or so that the transmitting electromagnetic wave energy of a data signal is larger than the electromagnetic wave energy of a startup signal, without departing from the gist of the invention described in the appended claims. The same can also be said with respect to the non-contact IC card system in the third aspect of the invention.

In the non-contact IC card of the present invention, as described above, the receiving sensitivity in the data communication step for exchanging data signals is increased relative to the receiving sensitivity in the startup step, in which a startup signal for starting up the non-contact IC card is received, by changing the amplification factor of a receiving amplifier or by changing connections to two types of receiving coil antennas differing from each other in at least one of number of turns, position, thickness, number and other factors. In this manner, a non-contact IC card can be provided which is always capable of receiving a data signal normally after it has started up by receiving a preceding startup signal, which is therefore free from data communication error and which has high reliability.

In the non-contact IC card terminal of the present invention, the transmitting electromagnetic wave energy of a data signal is increased relative to the electromagnetic wave energy of a startup signal by changing the amplification factor of a transmitting amplifier or by changing connections to two types of transmitting coil antennas differing from each other in at least one of number of turns, position, thickness, number and other factors, thereby ensuring that a non-contact IC card can always receive a data signal normally after it has started up by receiving a preceding startup signal. In this manner, a non-contact IC card terminal free from data communication failure and having high reliability can be provided.

In the non-contact IC card system of the present invention, the receiving sensitivity in the data communication step for exchanging data signals is increased relative to the receiving sensitivity in the startup step, in which a startup signal for starting up a non-contact IC card is received, by changing the amplification factor of a receiving amplifier or by selecting connections to two types of receiving coil antennas differing from each other in at least one of number of turns, position, thickness, number and other factors, while the transmitting electromagnetic wave energy of a data signal is increased relative to the electromagnetic wave energy of a startup signal by changing the amplification factor of a transmitting amplifier or by selecting connections to two types of transmitting coil antennas differing from each other in at least one of number of turns, position, thickness, number and other factors. In this manner, a non-contact IC card system can be provided which is always capable of exchanging data signals normally after a non-contact IC card has started up by receiving a preceding startup signal, which is free from data communication failure and which has high reliability.

What is claimed is:

1. A non-contact IC card comprising:
receiving means including first and second receiving sections wherein the first receiving section has a first detection threshold for detecting a received signal having a strength exceeding the first detection threshold, the second receiving section has a second detection threshold for detecting a received signal having a strength exceeding the second detection threshold, and the first detection threshold is higher than the second detection threshold;
a demodulation circuit connected to the receiving means for demodulating a received signal detected by one of the first and second receiving sections and producing demodulated signals;
selection means for selectively connecting the first and second receiving sections to the demodulation circuit; and
control means for controlling data processing by the non-contact IC card and for controlling the selection means, the control means receiving the demodulated signals from the demodulation circuit and controlling the selection means to connect the first receiving section to the demodulation circuit and, upon detection of a trigger signal by the first receiving section, disconnecting the first receiving section and connecting the second receiving section for detecting a data signal including data for processing by the control means.

2. The non-contact IC card according to claim 1 wherein the receiving means includes a coil antenna, and the first and second receiving sections respectively include first and second amplifiers for amplifying signals received by the coil antenna, the first amplifier having a first amplification factor, and the second amplifier having a second amplification factor smaller than the first amplification factor.

3. The non-contact IC card according to claim 1 wherein the receiving means includes a coil antenna for receiving signals, and the first and second receiving sections include an amplifier for amplifying signals received by the coil antenna, the amplifier having an amplification factor, and, respectively, first and second series connected input resistors for changing amplification by the amplifier, the first resistor having a smaller resistance than the second resistor.

4. The non-contact IC card according to claim 1 wherein the first and second receiving sections respectively include a first receiving coil antenna having a first number of turns and a second receiving coil antenna having a second number of turns smaller than the first number.

5. The non-contact IC card according to claim 1 wherein the first and second receiving sections respectively include a first receiving coil antenna formed of a conductor having a first thickness and a second receiving coil antenna formed of a conductor having a second thickness thinner than the first thickness.

6. The non-contact IC card according to claim 1 including a printed circuit board wherein the first and second receiving sections are arranged on the printed circuit board and the first and second receiving sections respectively include a first receiving coil antenna on an outer portion of the printed circuit board and a second receiving coil antenna on an inner portion of the printed circuit board.

7. The non-contact IC card according to claim 1 wherein the first and second receiving sections respectively include a first receiving coil antenna consisting of a pair of substantially identical coils connected in parallel and a second receiving coil antenna consisting of one coil identical to one of the coils of the first receiving coil antenna.

8. The non-contact IC card according to claim 1 including:
an oscillator for producing an oscillation signal;
a modulation circuit for modulating the oscillation signal to produce modulated signals; and
a transmitting antenna connected to the modulation circuit for transmitting the modulated signals wherein, upon detection of a trigger signal by the first receiving section, the control means connects the oscillation signal to the modulation circuit for generation of a reply signal supplied to the transmitting antenna for transmission to a terminal generating the trigger and data signals.

9. A terminal for triggering and exchanging data with a non-contact IC card comprising:
receiving means for detecting a reply signal from a non-contact IC card in response to a trigger signal transmitted by the terminal and for receiving data signals from the non-contact IC card;
a demodulation circuit connected to the receiving means for demodulating reply and data signals received from the non-contact IC card to produce demodulated signals;
a modulation circuit for modulating data and trigger signals; transmitting means including first and second transmitting sections wherein the first transmitting section produces data signal having a first electromagnetic energy, the sound transmitting section produces a trigger signal having a second electromagnetic energy, and the first electromagnetic energy is larger than the second electromagnetic energy;
selection means for selectively connecting the first and second transmitting sections to the modulation circuit; and
control means for controlling data processing of data signals received from the non-contact IC card and for controlling the selection means, the control means receiving the demodulated signals from the demodulation circuit and controlling the selection means to connect the second transmitting section to the modulation circuit to transmit a trigger signal and, upon detection of a reply signal from an IC card, disconnecting the second transmitting section from the modulation circuit and connecting the first transmitting section to the modulation circuit for transmitting data signals.

10. The terminal according to claim 9 wherein the first and second transmitting sections respectively include first and second amplifiers for amplifying signals received from the modulation circuit, and the first amplifier having a first amplification factor, the second amplifier having a second amplification factor smaller than the first amplification factor.

11. The terminal according to claim wherein; the first and second transmitting sections include an amplifier for amplifying signals received from the modulation circuit, the amplifier including first and second resistors for changing amplification by the amplifier, the first resistor having a smaller resistance than the second resistor.

12. The terminal according to claim 9 wherein the first and second transmitting sections respectively include a first transmitting coil antenna having a first number of turns and a second transmitting coil antenna having a second number of turns larger than the first number of turns.

13. The terminal according to claim 9 wherein the first and second transmitting sections respectively include a first transmitting coil antenna consisting of a conductor having a thickness and a second transmitting coil antenna consisting of a conductor thinner than said first transmitting coil antenna.

14. The terminal according to claim 9 including a printed circuit board and wherein the first and second transmitting sections respectively comprise a first transmitting coil antenna on an outer portion of the printed circuit board and a second transmitting coil antenna on an inner portion of the printed circuit board.

15. The terminal according to claim 9 wherein the first and second transmitting sections respectively include a first transmitting coil antenna consisting of a pair of substantially identical coils connected in parallel and a second transmitting coil antenna consisting of one coil substantially identical to one of the coils of the first transmitting coil antenna.

16. The terminal according to claim 9 wherein the first and second transmitting sections respectively include a pair of first transmitting coil antennas and a second transmitting coil antenna.

17. A non-contact IC card system comprising:
a terminal and non-contact IC card wherein the non-contact IC card includes:
first receiving means including first and second receiving sections wherein the first receiving section has a first detection threshold for detecting a received signal having a strength exceeding the first detection threshold, the second receiving section has a second detection threshold for detecting a received signal having a strength exceeding the second detection threshold, and the first detection threshold is higher than the second detection threshold;
a first demodulation circuit connected to the first receiving means for demodulating a received signal detected by one of the first and second receiving sections and producing first demodulated received signals;
first selection means for selectively connecting the first and second receiving sections to the first demodulation circuit; and
first control means for controlling data processing by the non-contact IC card and for controlling the first selection means, the first control means receiving the demodulated received signals from the first demodulation circuit and controlling the first selection means to connect the first receiving section to the first demodulation circuit and, upon detection of a trigger signal by the first receiving section, disconnecting the first receiving section and connecting the second receiving section for detecting a data signal including data for processing by the non-contact IC card;
an oscillator for producing an oscillation signal;
a first modulation circuit for modulating the oscillation signal to produce first modulated signals; and
a first transmitting antenna connected to the first modulation circuit for transmitting the first modulated signals wherein, upon detection of a trigger signal by the first receiving section, the control means connects the oscillation signal to the first modulation circuit for generation of a reply signal supplied to the transmitting antenna for transmission to a terminal generating the trigger and data signals;
and the terminal includes:
second receiving means for detecting a reply signal from the non-contact IC card in response to a trigger signal transmitted by the terminal and for receiving data signals from the non-contact IC card;
a second demodulation circuit connected to the second receiving means for demodulating reply and data signals received from the non-contact IC card and producing second demodulated received signals;
a second modulation circuit for modulating data and trigger signals;
transmitting means including first and second transmitting sections wherein the first transmitting section produces data signals having a first electromagnetic energy, the second transmitting section produces a trigger signal having a second electromagnetic energy, and the first electromagnetic energy is larger than the second electromagnetic energy;
second selection means for selectively connecting the first and second transmitting sections to the second modulation circuit; and
second control means for controlling data processing of data signals received from the non-contact IC card and for controlling the second selection means, the second control means receiving the second demodulated received signals from the second demodulation circuit and controlling the second selection means to connect the second transmitting section to the second modulation circuit to transmit a trigger signal and, upon detection of a reply signal from an IC card, disconnecting the second transmitting section from the second modulation circuit and connecting the first transmitting section to the second modulation circuit for transmitting data signals.

* * * * *

UNITED STATES PATENT AND TRADEMARK OFFICE
CERTIFICATE OF CORRECTION

PATENT NO. : 5,444,222

DATED : August 22, 1995

INVENTOR(S) : Inoue

It is certified that error appears in the above-identified patent and that said Letters Patent is hereby corrected as shown below:

Column 17, Line 47, delete "," ;
Column 18, Line 44, change "signal" to --signals--;
Column 19, Line  4, after "claim" insert --9--;
               Line  4, delete ";".

Signed and Sealed this

Twenty-sixth Day of March, 1996

Attest:

BRUCE LEHMAN

Attesting Officer        Commissioner of Patents and Trademarks